United States Patent
Han (10) Patent No.: US 11,440,024 B2
(45) Date of Patent: Sep. 13, 2022

(54) CONDUCTIVE FABRIC FILTER, METHOD FOR MANUFACTURING THE SAME AND ELECTRIC DUST COLLECTOR HAVING THE SAME

(71) Applicant: CS E&L Co., Ltd., Incheon (KR)

(72) Inventor: Won Jae Han, Incheon (KR)

(73) Assignee: CS E&L Co., Ltd., Incheon (KR)

( * ) Notice: Subject to any disclaimer, the term of this patent is extended or adjusted under 35 U.S.C. 154(b) by 88 days.

(21) Appl. No.: 16/802,636

(22) Filed: Feb. 27, 2020

(65) Prior Publication Data

US 2021/0245171 A1    Aug. 12, 2021

(30) Foreign Application Priority Data

Feb. 11, 2020    (KR) .................. 10-2020-0016378

(51) Int. Cl.
| | | |
|---|---|---|
| *B03C 3/60* | (2006.01) | |
| *B03C 3/47* | (2006.01) | |
| *D06M 11/83* | (2006.01) | |
| *C23C 18/22* | (2006.01) | |
| *C23C 18/16* | (2006.01) | |
| *C23C 18/38* | (2006.01) | |

(52) U.S. Cl.
CPC .................. *B03C 3/60* (2013.01); *B03C 3/47* (2013.01); *D06M 11/83* (2013.01); *C23C 18/1641* (2013.01); *C23C 18/22* (2013.01); *C23C 18/38* (2013.01); *D10B 2401/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,082,734 A | * | 1/1992 | Vaughn | C23C 18/30 428/411.1 |
| 5,492,677 A | * | 2/1996 | Yoshikawa | F01N 3/0892 422/174 |
| 6,527,834 B1 | * | 3/2003 | Jorder | B01D 39/2037 96/68 |
| 7,964,012 B2 | * | 6/2011 | Choi | B01D 46/521 55/524 |
| 10,168,059 B2 | * | 1/2019 | Yamaguchi | B03C 3/155 |

FOREIGN PATENT DOCUMENTS

| | | | |
|---|---|---|---|
| JP | H08-108092 A | 4/1996 | |
| JP | 2003-183886 A | 7/2003 | |
| KR | 100530973 B1 | 11/2005 | |
| KR | 100623853 B1 | 9/2006 | |
| KR | 101087055 B1 | 11/2011 | |
| KR | 101373720 B1 | 3/2014 | |
| KR | 20160067813 A | 6/2016 | |
| KR | 20160086209 A | 7/2016 | |
| WO | WO-9404014 A1 * | 2/1994 | ........... H05K 9/0041 |

* cited by examiner

*Primary Examiner* — Christopher P Jones
*Assistant Examiner* — Sonji Turner
(74) *Attorney, Agent, or Firm* — Osha Bergman Watanabe & Burton LLP (57) ABSTRACT

A conductive fabric filter includes a non-woven fabric coated with copper by electroless plating, and the non-woven fabric has pores and is conductive.

1 Claim, 5 Drawing Sheets

CONDUCTIVE FABRIC FILTER, METHOD FOR MANUFACTURING THE SAME AND ELECTRIC DUST COLLECTOR HAVING THE SAME

CROSS-REFERENCE TO RELATED APPLICATION

This application claims benefit of priority to Korean Patent Application No. 10-2020-0016378 filed on Feb. 11, 2020 in the Korean Intellectual Property Office, the disclosure of which is incorporated herein by reference in its entirety.

BACKGROUND

1. Field

The present disclosure relates to an electric dust collector using a conductive fabric filter, and more particularly, to an electric dust collector for collecting fine dust by applying constant voltages of different electrodes to a plurality of conductive fabric filters.

2. Description of Related Art

A general electric dust collector includes a charging part that generates corona discharge to supply a large amount of ions to the fine particles, which are particulate matter, and a dust collecting part that forms an electric field to collect fine particles charged by the charging part by an electrostatic force.

When air passes through the charging part and the dust collecting part, fine particles in the air is charged by the charging part and the charged fine particles are collected by the dust collecting part.

In general, the dust collecting part of the electric dust collector includes a plurality of electrodes, and the plurality of electrodes are spaced apart from each other to form an electric field.

However, the electric dust collector that charges and collects fine particles using corona discharge has a problem in that it cannot treat harmful gases (odor, acid, volatile organic compound (VOC), benzine, etc.). In order to solve this problem, an activated carbon filter is installed separately at a front or rear of the electric dust collector to treat harmful gases.

As such, the technology for treating a harmful gas and fine particles in an exhaust gas by installing the activated carbon filter at the front or rear of the electric dust collector is disclosed in Korea Patent Registration No. 530973 and Korea Patent Registration No. 623853 and the like.

These related art technologies have a problem that the installation of the separate activated carbon filter increases a size of an exhaust gas treatment device and an installation cost and a maintenance cost increase due to structural complication.

In order to solve the problem, a technology for miniaturizing the electric dust collector and improving dust collecting efficiency by applying a high voltage to a discharge electrode is disclosed in Korean Patent Registration No. 1087055, Korean Patent Registration No. 1373720, and the like.

However, in the electric dust collector, a charging part charging fine dust, a discharging unit generating an electric field by applying a high voltage, an activated carbon fiber filter part collecting charged fine dust, and the like are separately configured, which is still structurally complicated, incurs high installation cost, and increases power consumption due to application of a high voltage.

RELATED ART DOCUMENT

Patent Document (Patent document 1) Korean Patent Registration No. 530973 (dated Nov. 24, 2005)
(Patent document 2) Korean Patent Registration No. 623853 (dated Sep. 12, 2006)
(Patent document 3) Korean Patent Registration No. 1087055 (dated Nov. 28, 2011)
(Patent document 4) Korean Patent Registration No. 1373720 (dated Mar. 13, 2014)

SUMMARY

An aspect of the present disclosure may provide an electric dust collector for collecting fine dust by applying constant voltages of different electrodes to a plurality of conductive fabric filters.

In an aspect, a conductive fabric filter includes a non-woven fabric coated with copper by electroless plating, wherein the non-woven fabric has pores and is conductive.

The non-woven fabric may be polyester, polypropylene, polyethylene, polyester, a synthetic resin material of acryl, or a composite synthetic fiber thereof.

The copper may be one of pure copper, brass, bronze, or neo-copper.

The neo-copper (neo CU) may be a metal obtained by laminating copper to a zinc-based metal.

The pores may have the same size as the pores contained in the non-woven fabric before being coated with copper.

In another aspect, a method of manufacturing a conductive fabric filter, includes: an etching operation of removing an oxide film from a surface of a non-woven fabric and forming uniform surface roughness; a conditioning operation of removing an oxide film from the surface of the non-woven fabric and adsorbing a positive charge to facilitate adsorption of palladium (Pd); a pre-dipping operation of removing an oxide film generated in the etching operation or the conditioning operation and allowing palladium to be easily adsorbed to the surface of the non-woven fabric; a catalytic reaction operation of adsorbing palladium in a negative charge state to the surface of the non-woven fabric charged with the positive charge; a reduction operation of changing palladium adsorbed in the negative charge state into metal palladium with a reducing agent solution and allowing the changed metal palladium to be absorbed to the surface of the non-woven fabric; and a chemical copper plating operation of plating the surface of the non-woven fabric with palladium adsorbed thereto with copper to have a predetermined thickness to endow conductivity.

Pores included in the non-woven fabric may be maintained using an air discharge part among the etching operation, the conditioning operation, the pre-dipping operation, the catalysis reaction operation, the reduction operation, and the chemical copper plating operation.

The etching operation may be performed at 70° C. for 60 seconds, the conditioning operation may be performed at 50° C. for 90 seconds, the pre-dipping operation may be performed at 25° C. for 30 seconds, the catalytic reaction operation may be performed at 45° C. for 90 seconds, the reduction operation may be performed at 35° C. for 45 seconds, and the chemical copper plating operation may be performed at 45° C. for 300 seconds.

The copper may be one of pure copper, brass, bronze, or neo-copper.

The neo-copper (neo CU) may be a metal obtained by laminating copper to a zinc-based metal.

In another aspect, an electric dust collector may include: the foregoing conductive fabric filter; and a housing part including an inlet through which air including a foreign material flows in, an outlet through which air without the foreign material is discharged, and a seating portion in which a plurality of conductive fabric filters are seated and spaced apart from each other at a predetermined interval between the inlet and the outlet, wherein constant voltages having different polarities are applied to the plurality of conductive fabric filters facing each other.

In fine dust contained in the air, fine particles assuming a positive (+) electric charge, while passing through the pores of the conductive fabric filter, may be adsorbed to the conductive fabric filter to which a negative (−) electric charge and fine particles assuming the negative (−) electric charge, while passing through the pores of the conductive fabric filter, may be adsorbed to the conductive fabric filter to which the positive (+) electric charge.

The constant voltages may be DC 1V to 12V.

In addition to the technical tasks of the present disclosure mentioned above, other features and advantages of the present disclosure may be described below and may be clearly understood by those skilled in the art to which the present disclosure pertains or from the descriptions.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

In the present disclosure, in adding reference numerals for elements in each figure, it should be noted that like reference numerals already used to denote like elements in other figures are used for elements wherever possible.

Terms described in the present disclosure may be understood as follows.

It should be understood that the terms such as "comprising", "including" do not exclude existence or additions of one or more other features, numbers, steps, operations, constituent elements, or combinations thereof.

The term "on" should be construed as including a case where one element is formed at a top of another element and moreover a case where a third element is disposed therebetween.

Hereinafter, embodiments of the present disclosure devised to solve the foregoing problems will be described in detail with reference to the accompanying drawings.

Figure 1:
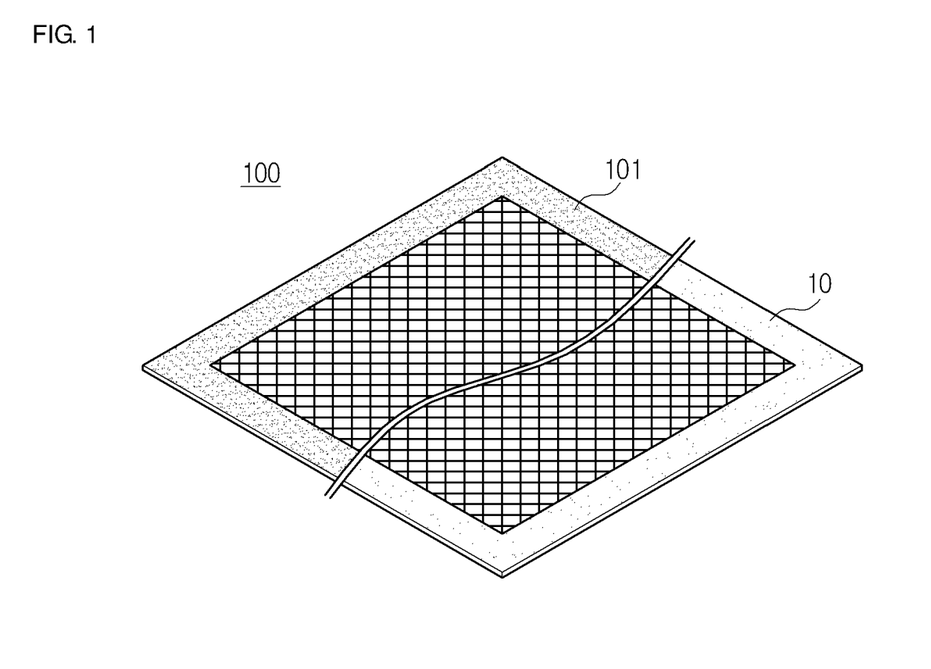
FIG. 1 is a view showing a conductive fabric filter according to an embodiment of the present disclosure.
Figure 2A:
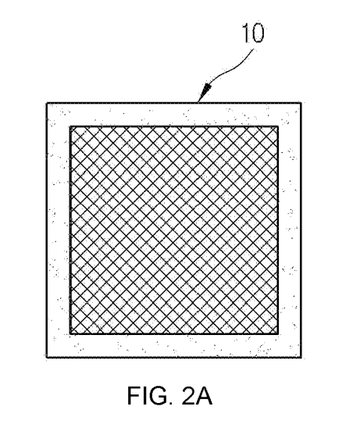
FIG. 2A and FIG. 2B show a view of a conductive nonwoven filter before and after being coated by electroless plating according to an embodiment of the present disclosure.
Figure 2B:
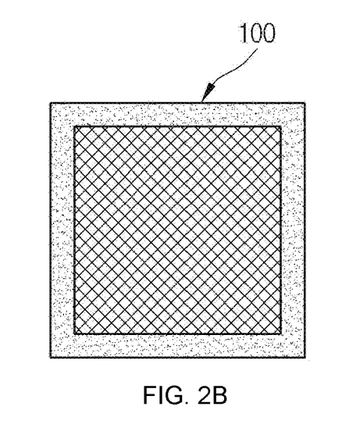

FIG. 1 is a view showing a conductive fabric filter according to an embodiment of the present disclosure, and FIG. 2A and FIG. 2B show a view showing a conductive nonwoven filter before and after being coated by electroless plating according to an embodiment of the present disclosure.

Referring to FIG. 1, FIG. 2A, and FIG. 2B, a conductive fabric filter 100 may include a non-woven fabric 10 and copper 101.

The conductive fabric filter 100 may be obtained by coating the non-woven fabric 10 with the copper 101 by electroless plating, has pores, and is conductive.

A material of the non-woven fabric 10 may be polyester, polypropylene, polyethylene, polyester, a synthetic resin material of acryl, or a composite synthetic fiber thereof.

As an example, the composite synthetic fiber may be a synthetic fiber produced by a technology of bonding polyester and polypropylene.

Polyester fiber may include polyethylene terephthalate (PET), polyglycolide (PGA), polylactic acid (PLA), polycaprolactone (PCL), polyhydroxyalkanoate (PHA), polyhydroxybutyrate (PHB), polyethylene adipate (PEA), polybutylene succinate (PBS), poly(3-hydroxybutyrate-co-3-hydroxyvalerate (PHBV), polybutylene terephthalate (PBT), polytrimethylene terephthalate (PTT), polyethylene naphthalate (PEN), and vectran.

Electroless plating is a method of depositing a metal coating using a reducing agent without using power provided from the outside.

Since external power is not used, a thickness of plating due to a non-uniform distribution of a current in the process of plating is not varied, and plating may be performed even on a complicated or precise shape or a nonconductor.

The copper 101 may be one of pure copper, brass, bronze, or neo-copper (neo-Cu).

Brass is an alloy made by adding zinc to copper, and bronze is an alloy made by adding tin to copper, and thus, brass and bronze are not easily oxidized as compared with pure copper, thereby improving a service life.

Neo-copper may be an alloy produced by laminating copper to an economical yet high strength zinc-based metal.

In general, laminating finish is a treatment of adhering a plastic film, plastic foam, paper cloth, or the like to cloth or paper, and is a method of adhering such material using an adhesive by roll pressure or by heating and fusing.

Neo-copper may be prepared by fusing copper to a zinc-based metal using such laminate finish.

Neo-copper advantageously makes up for soft stiffness, a shortcoming of copper, while having a sterilization ability, a strong point of copper. In addition, neo-copper is cheaper than copper which is costly, thus reducing a production cost.

Thus, the conductive fabric filter 100 may be obtained by coating the non-woven fabric 10 with the copper 101 and manufactured to make use of the pores inherent to the non-woven fabric 10.

That is, the pores included in the non-woven fabric 10 may also be included in the conductive fabric filter 100, and the pores in this case may have the same size as that of the pores of the non-woven fabric before the copper 101 is applied.

By forming pores in the conductive fabric filter 100, particles larger than a size of the pores in the air cannot pass through the pores and particles smaller than the pores may be filtered by adsorption using a constant voltage by the conductivity of the copper 101 coated on the non-woven fabric 10.

Large particles may be primarily filtered by the pores of the conductive fabric filter 100 and small particles may be secondarily filtered through the copper 101 coated on the conductive fabric filter 100, whereby a harmful material, e.g., even small particles such as fine dust, in the air may be easily blocked even without an additional complicated filter.

Figure 3:
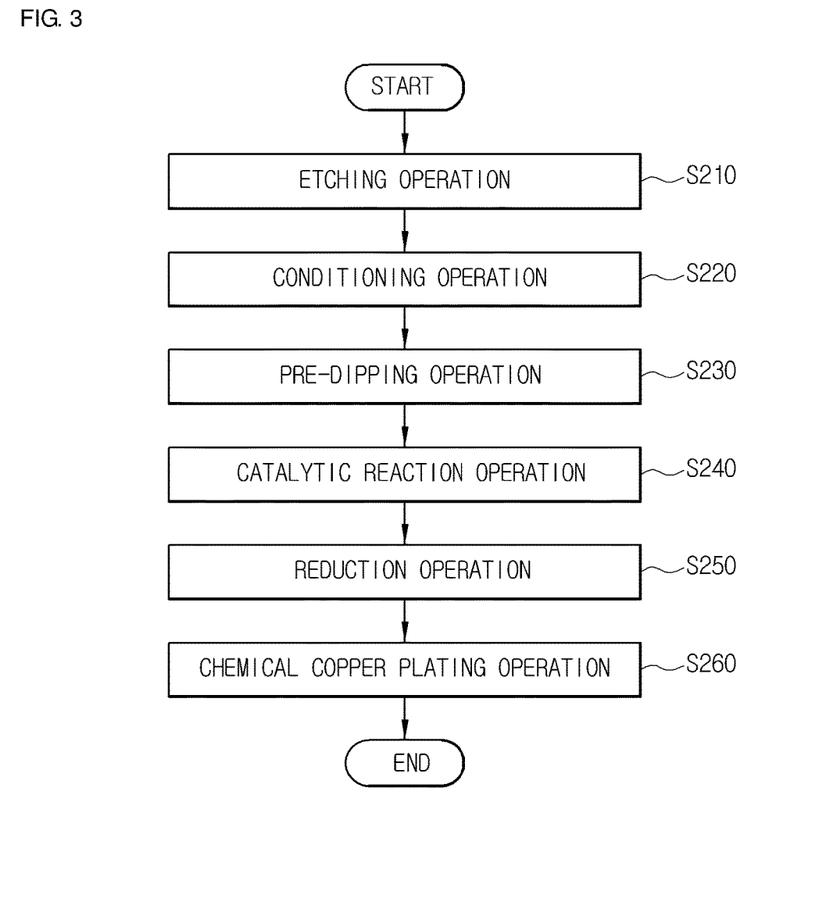
FIG. 3 is a flowchart illustrating a method of manufacturing a conductive fabric filter according to an embodiment of the present disclosure.
Figure 4:
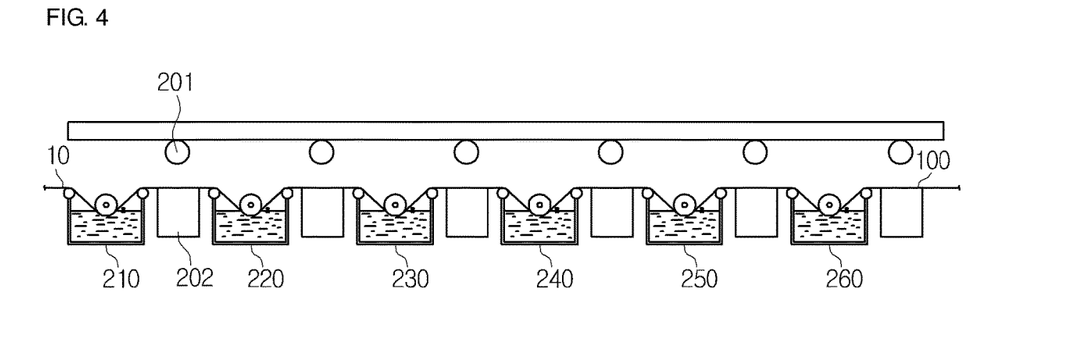
FIG. 4 is a flowchart illustrating a manufacturing process corresponding to the manufacturing method of FIG. 3.

FIG. 3 is a flowchart showing a method of manufacturing a conductive fabric filter according to an embodiment of the present disclosure and FIG. 4 is a view showing a manufacturing process corresponding to the manufacturing method of FIG. 3.

Referring to FIGS. 3 and 4, the method of manufacturing the conductive fabric filter 100 may include an etching operation S210, a conditioning operation S220, pre-dipping operation S230, a catalytic reaction operation S240, a reduction operation S250 and a chemical copper plating operation S260.

Here, a process of injecting air to the non-woven fabric 10 using an air discharge part 201 may be provided between each of the etching operation S210, the conditioning operation S220, the pre-dipping operation S230, the catalytic reaction operation S240, the reduction operation S250 and the chemical copper plating operation S260, and the air discharge part 201 may allow the pores included in the non-woven fabric 10 to be maintained as is although each manufacturing process is performed.

The air discharge part 201 may be formed of an air brush, or the like, for injecting air.

As air is injected by the air discharge part 201, the pores of the fabric may not be clogged each time each process is performed, but an oxide film may be formed on the non-woven fabric 10. Such an oxide film may be removed by an aqueous solution stored in each chamber in a next stage in which the fabric passing through the air discharge part 201 is submerged.

Also, the aqueous solution blocking the non-woven fabric pores may be discharged to a storage container 202 by the air discharge part 201 and stored.

Hereinafter, each process will be described in detail.

The etching operation S210 may be an operation for removing the oxide film from the surface of the non-woven fabric 10 and forming uniform surface roughness.

An etching chamber 210 in which the non-woven fabric is submerged in the etching operation S210 may storage an aqueous solution including sodium bisulfite ($NaHSO_3$), sulfuric acid ($H_2SO_4$), ammonium persulfate ($(NH_4)_2S_2O_8$), and pure water to help clean the surface of the non-woven fabric 10.

For example, the oxide film present on the non-woven fabric 10 may be removed through a soft-etching process in the etching chamber 210.

The oxide film formed on the surface of the non-woven fabric 10 may hinder copper to be applied by electroless plating later from being adhered to the surface of the non-woven fabric 10, and thus, the oxide film on the surface of the non-woven fabric 10 may be removed through the etching operation S210 to thereby enhancing adhesion of a copper coating to be coated on the surface of the non-woven fabric 10.

Further, the etching operation S210 may be performed for 60 seconds at 70° C.

If the etching operation S210 is performed for more than 60 seconds at a temperature higher than 70° C., the surface of the non-woven fabric 10 may be damaged, and if the etching operation S210 is performed for less than 60 seconds at a temperature of lower than 70° C., the oxide film on the surface of the non-woven fabric 10 may not be properly removed and may hinder copper from being adhered to the surface of the non-woven fabric 10.

The conditioning operation S220 may be an operation of removing an oxide coating from the surface of the non-woven fabric and adsorbing a positive charge.

In the conditioning operation S220, a conditioning chamber 220 in which the non-woven fabric 10 from which the oxide film was removed may be submerged may store $PdCl_2$.

As the non-woven fabric 10 passes through the conditioning chamber 220 storing $PdCl_2$, metal ions, specifically, positive charges adsorbed to a hole wall of the non-woven fabric 10, and palladium (Pd) adsorbed to the surface of the non-woven fabric 10 later, are easily adsorbed to the surface of the non-woven fabric 10.

However, storing $PdCl_2$ in the conditioning chamber 220 is to adsorb the metal ions to the surface of the non-woven fabric 10 as described above, and thus, it is natural that an alternative solution, other than $PdCl_2$, allowing the metal ions to be adsorbed to the surface of the non-woven fabric 10 may be stored.

Further, the conditioning operation S220 may be performed for 90 seconds at a temperature of 50° C.

If the conditioning operation S220 is performed for more than 90 seconds at a temperature higher than 50° C., positive charges may not be sufficiently adsorbed to the surface of the non-woven fabric 10, and if the conditioning operation S220 is performed for less than 90 seconds at a temperature lower than 50° C., a rate of removing the oxide film may be reduced.

The pre-dipping operation S230 may be an operation of endowing wettability to the surface of the non-woven fabric 10 to facilitate adsorption of palladium and may be an operation of removing an oxide film generated in the etching operation S210 or the conditioning operation S220 in the etching operation S210 or conditioning operation S220.

A pre-dip chamber 230 in which the non-woven fabric is submerged in the pre-dipping operation S230 may store an aqueous solution including diluted hydrochloric acid or the like, and the pre-dipping operation S230 may be performed for 30 seconds at 25° C.

If the pre-dipping operation S230 is performed at a temperature higher than 25° C. for more than 30 seconds, adhesion of palladium to the surface of the non-woven fabric 10 may be reduced in the catalytic reaction operation S240 after the pre-dipping operation S230, and if the pre-dipping operation S230 is performed at a temperature lower than 25° C. for less than 30 seconds, not only adhesion of palladium to the surface of the non-woven fabric 10 may be reduced but also the oxide film may not be easily removed.

In addition, the pre-dipping operation S230 may protect a catalytic solution such that inflow of water or other impurities in the catalytic solution is minimized.

The catalytic reaction operation S240 may be an operation of adsorbing palladium in a negative charge state to the surface of the non-woven fabric 10 charged with positive charges by a cationic surfactant.

Specifically, palladium in the negative charge state may be adsorbed to a surface of a copper foil surface at an inner wall of a hole charged with positive charges.

A catalytic reaction chamber 240 in which the non-woven fabric is submerged in the catalytic reaction operation S240 may store an aqueous solution obtained by dissolving a metal formed of palladium chloride ($PdCl_2$) or palladium sulfate ($PdSO_4$) in an acid solution such as hydrochloric acid, sulfuric acid, or the like.

However, this is merely an example for practicing the present disclosure and the palladium chloride ($PdCl_2$) or palladium sulfate ($PdSO_4$) may be replaced by a metal such as nickel chloride ($NiCl_2$), zinc chloride ($ZnCl_2$), silver chloride (AgCl), copper chloride ($CuCl_2$), iron chloride ($FeCl_2$), tin chloride ($SnCl_2$), antimony chloride ($SbCl_3$), or indium chloride ($InCl_3$).

Further, the catalytic reaction operation S240 may be performed for 90 seconds at 45° C.

If the catalytic reaction operation S240 is performed for more than 90 seconds at a temperature higher than 45° C., adhesion of palladium in the negative charge state to the surface of the copper foil at the inner wall of the hole may be reduced, and if the catalytic reaction operation S240 is performed for less than 90 seconds at a temperature lower than 45° C., not only adhesion of palladium in the negative charge state to the surface of the copper foil at the inner wall of the hole may be reduced but also the oxide film may not be easily removed.

The reduction operation S250 may be an operation of changing palladium adsorbed in a negative charge state into metal palladium using a reducing agent solution and adsorbing the metal palladium to the surface of the non-woven fabric 10.

A reduction chamber 250 in which the non-woven fabric 10 is submerged in the reduction operation S250 may store a reducing agent of formaldehyde or dimethylamine borane, but alternatively, various reducing agents that may change palladium in the negative charge state into the metal palladium may be stored in the reduction chamber 250.

Further, the reduction operation S250 may be performed at 35° C. for 45 seconds.

If the reduction operation S250 is performed at 35° C. for 45 seconds, the palladium in the negative charge state may be most smoothly changed into a metal palladium.

The chemical copper plating operation S260 may be an operation of plating the surface of the non-woven fabric to which palladium is adsorbed with copper to have a predetermined thickness by a chemical reaction to endow conductivity.

Here, copper may be one of pure copper, brass, bronze or neo-copper.

Brass is an alloy made by adding zinc to copper, bronze is an alloy made by adding tin to copper, and neo-copper is a metal obtained by laminating copper to a zinc-based metal.

A chemical copper plating chamber 260 in which the non-woven fabric 10 is submerged in the chemical copper plating operation S260 may store an aqueous solution in which a metal material containing copper ions is dissolved.

The non-woven fabric 10 submerged in the chemical copper plating chamber 260 through the reduction operation S250 may be plated with a thickness of 0.3 to 0.5 μm on the inner wall of the palladium-adsorbed hole by reductive-precipitating $Cu^{2+}$ ions by a chemical reaction.

Further, the chemical copper plating operation S260 may be performed at 45° C. for 300 seconds.

If the chemical copper plating operation S260 is performed at a temperature higher than 45° C. for more than 300 seconds, the thickness of the plating formed by reductive-precipitating $Cu^{2+}$ ions may be increased, and if the chemical copper plating operation S260 is performed at a temperature lower than 45° C. for less than 300 seconds, the plating may be so thin as to be easily peeled off.

As for the conductive fabric filter 100 manufactured through up to the chemical copper plating operation S260, since the non-woven fabric is coated with a metal coating using a reducing agent without using external power, the plating may be formed with a uniform thickness on the fabric and the metal coating may be easily coated even between the fine pores of the fabric.

Figure 5:
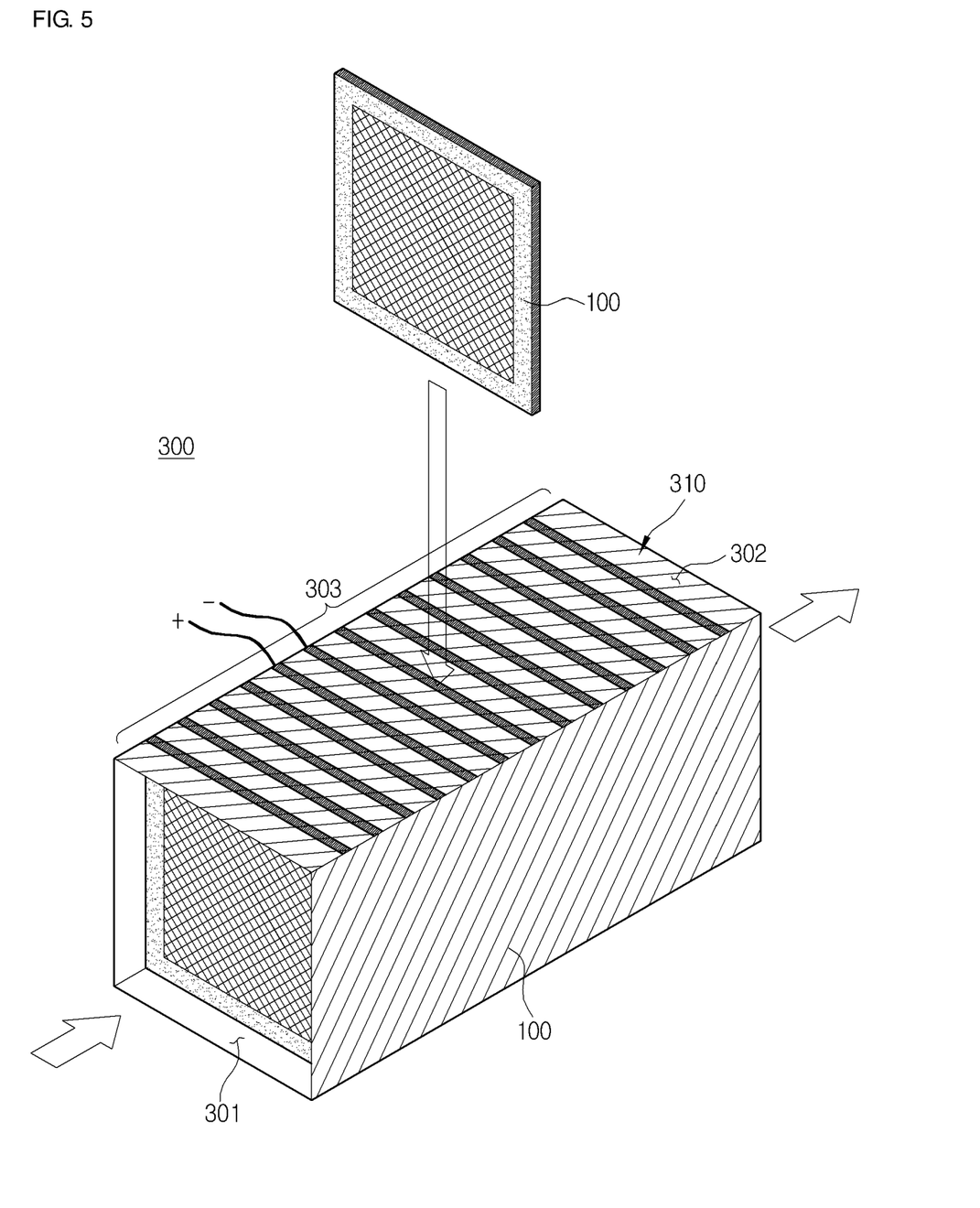
FIG. 5 is a perspective view of an electric dust collector including a conductive fabric filter according to an embodiment of the present disclosure.

FIG. 5 is a perspective view of an electric dust collector including a conductive fabric filter according to an embodiment of the present disclosure.

Referring to FIG. 5, an electric dust collector 300 may include the conductive fabric filter 100 and a housing part 310.

Since the conductive fabric filter 100 has been described above as a non-woven fabric coated with copper through electroless plating, repeated contents will be omitted.

The housing part 310 may include an inlet 301, an outlet 302, and a seating portion 303.

The inlet 301 may allow air containing a foreign material such as fine dust to flow in therethrough.

The outlet 302 may discharge clean air from which the foreign material was removed. That is, as the air flowing in through the inlet 301 passes through an inside of the housing part 310 including the conductive fabric filter 100, clean air, from which even fine dust, as well as a foreign material having large particles was removed is discharged.

The seating portion 303 may be included in the housing part 310 so that a plurality of conductive fabric filters 100 are seated and spaced apart from each other at regular, predetermined intervals between the inlet 301 and the outlet 302.

In the plurality of conductive fabric filters 100 seated in the seating portion 303, voltages having different polarities may be applied to a pair of conductive fabric filters 100 facing each other.

Here, DC 1V to 12V may be applied to the conductive fabric filters 100.

Voltages applied to the conductive fabric filters 100 may vary depending on a type of metal coated on the conductive fabric filters 100.

For example, if the conductive fabric filter 100 is coated with pure copper, a low DC voltage may be applied, and if the conductive fabric filter 100 is coated with a copper alloy, a higher DC voltage may be applied.

Here, the housing part 310 may be formed of an insulator material and may confine a charge applied to the conductive fabric filter 100.

A method of removing a foreign material in the air through a voltage, such as electric dust collecting method, plasma method, or the like removes a foreign material in the air using a high voltage of thousands of volts, and thus, power consumption is increased and, in order to remove both foreign material of large particles and foreign material of small particles such as fine dust in the air, various types of devices from a filter device capable of removing large particles and an absorption type filter capable of removing small particles must be additionally used.

However, in the present disclosure, large particles are primarily filtered through the pores included in the plurality of conductive fabric filters 100 seated in the housing part 310 and small particles assuming electric charges may be secondarily adsorbed by applying a constant voltage of 5V to copper coated through electroless plating.

Power consumption may be reduced by enabling the constant voltage dust collecting method as described above, and various types of devices are not additionally required, thereby miniaturizing the dust collector and thus reducing an installation cost.

The electric dust collector according to an embodiment of the present disclosure will be described in more detail.

Figure 6:
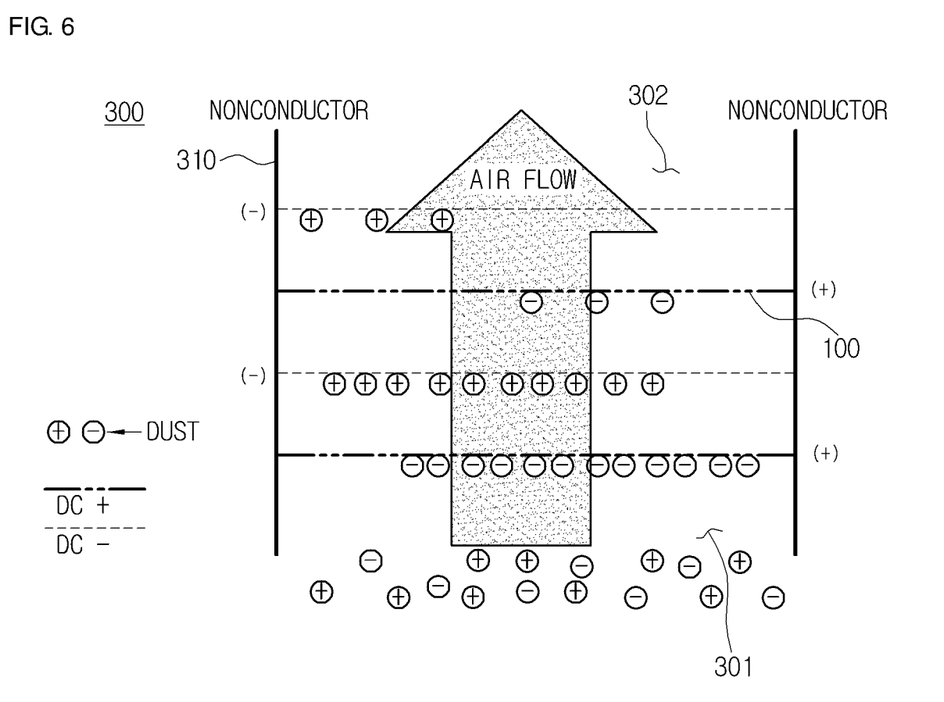
FIG. 6 is a diagram illustrating a method of adsorbing fine dust in the air by a conductive fabric filter according to an embodiment of the present disclosure.

FIG. 6 is a diagram illustrating a method of adsorbing fine dust in the air by a conductive fabric filter according to an embodiment of the present disclosure.

Referring to FIG. 6, in the electric dust collector 300 according to an embodiment of the present disclosure, air including fine dust may be primarily filtered by the pores of the conductive fabric filter 100, while passing through the conductive fabric filter 100 to which different constant voltages having different polarities are applied, and may be secondarily filtered to be adsorbed by a constant voltage applied to the conductive fabric filter 100.

Constant voltages having different voltages may be applied to a pair of conductive fabric filters 100 facing each other included in the housing part 310.

Here, the housing part 310 may be a nonconductor formed of an insulator material to confine electric charges applied to the conductive fabric filter 100.

In the electric dust collector 300 according to an embodiment of the present disclosure, by applying constant voltages having different polarities to the pair of conductive fabric filters 100 facing each other, fine particles assuming a positive (+) electric charges in fine dust may be adsorbed to the conductive fabric filter 100 to which negative (−) electric charges are applied and fine particles assuming negative (−) electric charges may be adsorbed to the conductive fabric filter 100 to which positive (+) electric charges are applied.

As such, since the electric dust collector 300 according to an embodiment of the present disclosure primarily filters fine dust by the pores of the conductive fabric filter 100, and secondarily filters fine dust by the applied constant voltage, dust collecting efficiency may be increased by 40% as compared with a general fabric filter.

Figure 7A:
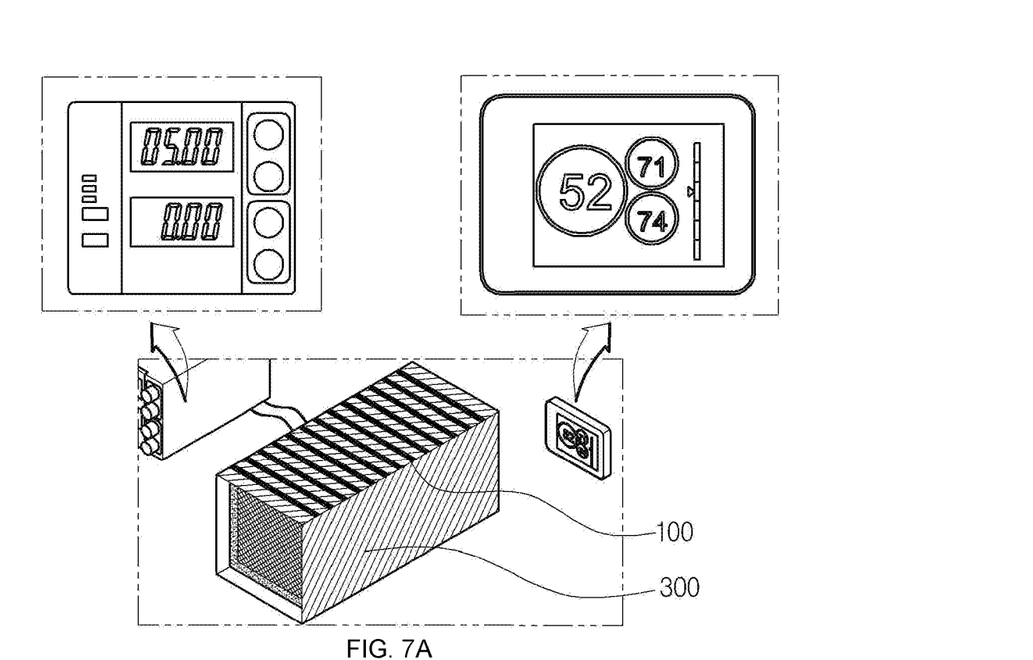
FIG. 7A, FIG. 7B, and FIG. 7C show a view showing results of a test using an electric dust collector including a conductive fabric filter according to an embodiment of the present disclosure.
Figure 7B:
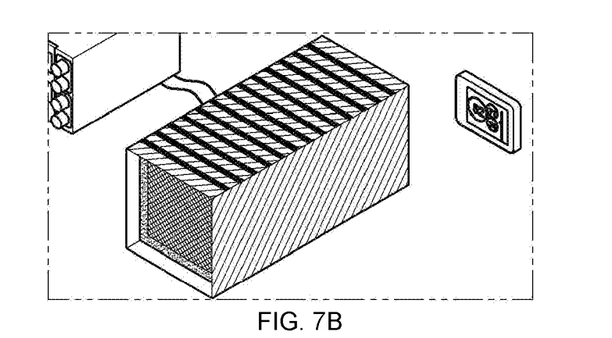
Figure 7C:
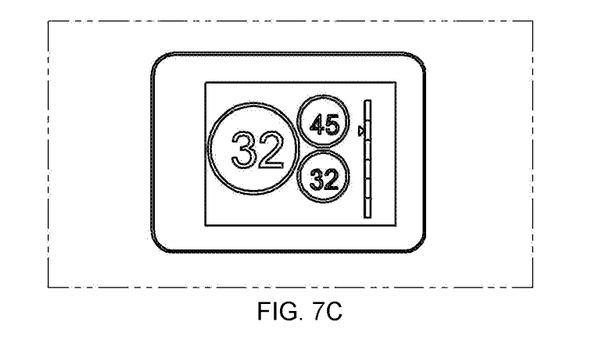

FIG. 7A, FIG. 7B, and FIG. 7C show a view showing results of a test using an electric dust collector including the conductive fabric filter according to an embodiment of the present disclosure.

Referring to FIG. 7A and FIG. 7B, experiment was conducted by placing the electric dust collector 300 including the conductive fabric filter 100 in front of a window and applying a voltage 5V.

A fine dust measurement device placed directly in front of the window measured a pollution level of air introduced through the window without any filter. As a result, a quality index of air was good as 71 and a standard particle concentration and ultrafine dust were 74 and 52, respectively, which were rather bad.

Meanwhile, referring to FIG. 7C, the fine dust measurement device placed in front of the electric dust collector 300 including the conductive fabric filter 100 measured a pollution level of air after air introduced to the electric dust collector 300 from the window passes through the plurality of conductive fabric filters 100. As a result, the quality index of air was the highest as 45 and the standard particle concentration and the ultrafine dust were each good as 32.

This is a result of 40% higher dust collection efficiency than the value of filtering a foreign material in the air with only the non-woven fabric before the fabric is coated with copper by electroless plating.

In addition, the electric dust collector according to the related art separately includes a charging part charging fine dust, a discharge part generating an electric field by an applied high voltage, an activated carbon fiber filter part collecting charged fine dust, and the like, and thus, the electric dust collector is structurally complicated, an installation cost is high, and power consumption is increased by applying a high voltage.

In contrast, the electric dust collector 300 according to an embodiment of the present disclosure, which includes the conductive fabric filter 100 and the housing part 310, advantageously has a simple structure and incurs a low installation cost.

In addition, since the electric dust collector 300 including the conductive fabric filter 100 according to the embodiment of the present disclosure uses a constant voltage of 5V, thereby reducing a power usage amount.

As set forth above, the present disclosure has the following advantages.

The present disclosure has the advantage that the structure is simple and the installation cost is low by simply including the conductive fabric filter and the housing part.

The present disclosure may improve dust collecting efficiency by primarily filtering fine dust by the pores of the conductive fabric filter and secondarily filtering fine dust by a constant voltage applied to the conductive fabric filter.

The present disclosure may reduce power consumption by using a low constant voltage in the conductive fabric filter.

In addition, other features and advantages of the present disclosure may be newly understood through the embodiments of the present disclosure.

While exemplary embodiments have been shown and described above, it will be apparent to those skilled in the art that modifications and variations could be made without departing from the scope of the present disclosure as defined by the appended claims.

What is claimed is:

1. An electric dust collector comprising:
   conductive fabric filters each comprising:
      a non-woven fabric coated with copper by electroless plating, wherein the non-woven fabric has pores and is conductive; and
   a housing part comprising:
      an inlet through which air including a foreign material flows;
      an outlet through which the air without the foreign material is discharged; and
      a seating portion in which the conductive fabric filters are seated and spaced apart from each other at a predetermined interval between the inlet and the outlet, wherein
   the conductive fabric filters are configured such that, when opposite polarity DC voltages, between 1 V and 12 V, are applied to the conductive fabric filters, the conductive fabric filters include:
      a positive conductive fabric filter, to which a positive (+) electric charge is applied; and
      a negative conductive fabric filter, to which a negative (−) electric charge is applied, and
   fine dust particles in the air, that have a positive (+) electric charge while passing through the pores of the negative conductive fabric filter, are adsorbed to the negative conductive fabric filter, and fine dust particles in the air, that have a negative (−) electric charge while passing through the pores of the positive conductive fabric filter, are adsorbed to the positive conductive fabric filter.

\* \* \* \* \*